(12) United States Patent
Chandrasekaran

(10) Patent No.: US 12,736,357 B2
(45) Date of Patent: Sep. 15, 2026

(54) ESTIMATING DISTANCES USING CLUSTERING ALGORITHMS

(71) Applicant: T-MOBILE INNOVATIONS LLC, Overland Park, KS (US)

(72) Inventor: Nirmal Chandrasekaran, Hillsborough, NJ (US)

(73) Assignee: T-MOBILE INNOVATIONS LLC, Overland Park, KS (US)

( * ) Notice: Subject to any disclaimer, the term of this patent is extended or adjusted under 35 U.S.C. 154(b) by 154 days.

(21) Appl. No.: 18/394,410

(22) Filed: Dec. 22, 2023

(65) Prior Publication Data

US 2025/0207925 A1 Jun. 26, 2025

(51) Int. Cl.
*G01C 21/34* (2006.01)
*G06F 18/23213* (2023.01)

(52) U.S. Cl.
CPC ... *G01C 21/3446* (2013.01); *G06F 18/23213* (2023.01)

(58) Field of Classification Search
None
See application file for complete search history.

(56) References Cited

U.S. PATENT DOCUMENTS

2013/0345969 A1* 12/2013 Udeshi .................. H04W 4/023 701/461
2020/0173789 A1* 6/2020 Kelleher .............. G06Q 10/047
2020/0400449 A1* 12/2020 Jackson ................. G06Q 10/08
2023/0192121 A1* 6/2023 Zhang ............... G06F 18/23213 701/25
2023/0330764 A1* 10/2023 Ott ........................... B23K 9/12
2024/0156530 A1* 5/2024 Zaides ................... A61B 34/20

FOREIGN PATENT DOCUMENTS

CN 108334994 A * 7/2018 ....... G06F 18/23213
CN 110530386 A * 12/2019 ......... G01C 21/3446
CN 111954874 A * 11/2020 ............. G06Q 10/08
CN 112052548 A * 12/2020 ....... G06F 18/23213
CN 118243119 A * 6/2024 ......... G01C 21/3453
EP 4002321 A1 * 5/2022 ........... G06F 18/231

OTHER PUBLICATIONS

English Translation of CN-118243119-A (Year: 2022).*
English Translation of CN-112052548-A (Year: 2020).*
English Translation of CN-110530386-A (Year: 2019).*
English Translation of CN-108334994-A (Year: 2018).*
English Translation of CN-111954874-A (Year: 2020).*

* cited by examiner

*Primary Examiner* — Thomas E Worden
(74) *Attorney, Agent, or Firm* — SHOOK, HARDY & BACON L.L.P.

(57) ABSTRACT

Systems and methods are provided for determining routes between geographic locations and estimating lengths thereof. When a set of geographic locations is too large to be accepted as input into drive-routing software, it is broken into smaller clusters using affinity propagation. When affinity propagation fails to yield desired results, the geographic locations are clustered using a combination of density-based and k-means clustering algorithms. The resulting clusters are provided as inputs to the drive-routing software. The routes between the clustered geographic locations are used to, for example, estimate a length of a utility needed to reach each of the geographic locations.

7 Claims, 8 Drawing Sheets

ESTIMATING DISTANCES USING CLUSTERING ALGORITHMS

SUMMARY

The present disclosure is directed, in part, to determining routes between geographic locations and estimating lengths thereof, substantially as shown in and/or described in connection with at least one of the figures, and as set forth more completely in the claims.

In aspects set forth herein, geographic locations are broken into clusters using affinity propagation and/or a combination of density-based and k-means clustering algorithms. Routes are determined between the geographic locations of each cluster. Driving (i.e., road-based) routes and linear routes can each be determined in order to provide upper- and lower-bound estimates of distances between the geographic locations. The distances, alone or in combination with a last-mile distance, can be used to estimate a cost of routing a utility to the geographic locations.

This summary is provided to introduce a selection of concepts in a simplified form that are further described below in the detailed description. This summary is not intended to identify key features or essential features of the claimed subject matter, nor is it intended to be used in isolation as an aid in determining the scope of the claimed subject matter.

BRIEF DESCRIPTION OF THE DRAWINGS

Implementations of the present disclosure are described in detail below with reference to the attached drawing figures, wherein.

DETAILED DESCRIPTION

Figure 1:
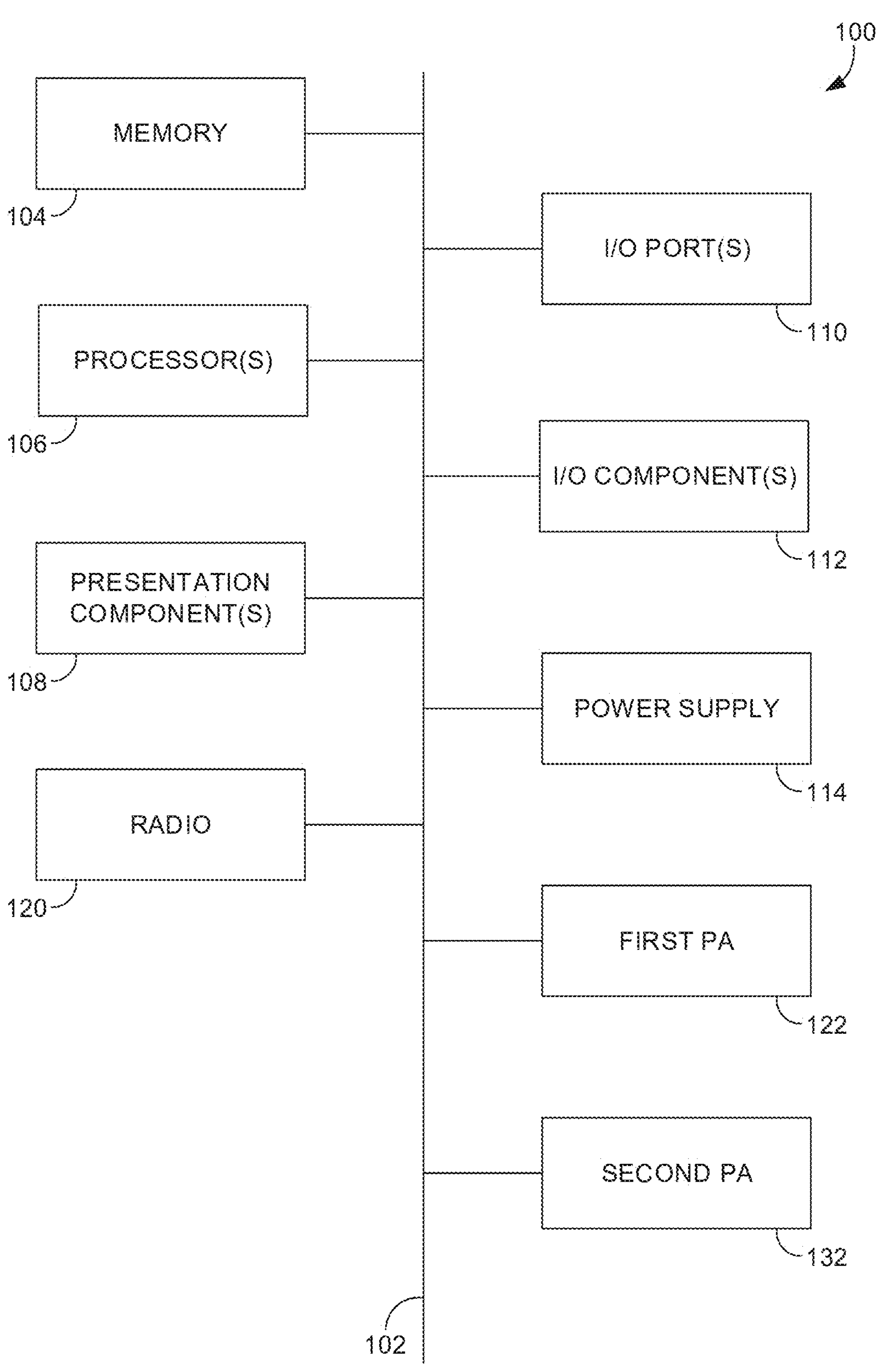
FIG. 1 depicts an exemplary computing environment suitable for use in implementations of the present disclosure.

The subject matter of embodiments of the invention is described with specificity herein to meet statutory requirements. However, the description itself is not intended to limit the scope of this patent. Rather, the inventors have contemplated that the claimed subject matter might be embodied in other ways, to include different steps or combinations of steps similar to the ones described in this document, in conjunction with other present or future technologies. Moreover, although the terms "step" and/or "block" may be used herein to connote different elements of methods employed, the terms should not be interpreted as implying any particular order among or between various steps herein disclosed unless and except when the order of individual steps is explicitly described.

Various technical terms, acronyms, and shorthand notations are employed to describe, refer to, and/or aid the understanding of certain concepts pertaining to the present disclosure. Unless otherwise noted, said terms should be understood in the manner they would be used by one with ordinary skill in the telecommunication arts. An illustrative resource that defines these terms can be found in Newton's Telecom Dictionary, (e.g., 32d Edition, 2022).

Embodiments of the technology described herein may be embodied as, among other things, a method, system, or computer-program product. Accordingly, the embodiments may take the form of a hardware embodiment, or an embodiment combining software and hardware. An embodiment takes the form of a computer-program product that includes computer-useable instructions embodied on one or more computer-readable media that may cause one or more computer processing components to perform particular operations or functions.

Computer-readable media include both volatile and nonvolatile media, removable and nonremovable media, and contemplate media readable by a database, a switch, and various other network devices. Network switches, routers, and related components are conventional in nature, as are means of communicating with the same. By way of example, and not limitation, computer-readable media comprise computer-storage media and communications media.

Computer-storage media, or machine-readable media, include media implemented in any method or technology for storing information. Examples of stored information include computer-useable instructions, data structures, program modules, and other data representations. Computer-storage media include, but are not limited to RAM, ROM, EEPROM, flash memory or other memory technology, CD-ROM, digital versatile discs (DVD), holographic media or other optical disc storage, magnetic cassettes, magnetic tape, magnetic disk storage, and other magnetic storage devices. These memory components can store data momentarily, temporarily, or permanently.

Communications media typically store computer-useable instructions—including data structures and program modules—in a modulated data signal. The term "modulated data signal" refers to a propagated signal that has one or more of its characteristics set or changed to encode information in the signal. Communications media include any information-delivery media. By way of example but not limitation, communications media include wired media, such as a wired network or direct-wired connection, and wireless media such as acoustic, infrared, radio, microwave, spread-spectrum, and other wireless media technologies. Combinations of the above are included within the scope of computer-readable media.

By way of background, utility providers face difficulties when assessing the economic viability of routing utilities (e.g., fiber, cable, or plumbing) to new geographic locations (e.g., residences or commercial buildings). The cost associated with laying additional infrastructure depends principally on the length of the infrastructure required. Conventionally, utility providers estimate such distances by physically traversing the area in question. These approaches are very slow—especially for large sets of geographic locations—and are prone to human error.

In some embodiments of the present disclosure, the geographic locations are provided as inputs to drive-routing software such that a road-based route connecting each geographic locations is determined. Drive-routing software programs, many of which are commercially available, utilize algorithms to determine a shortest path (e.g., a driving path) that connects a given set of geographic locations. Such routes reasonably approximate the length of the utility needed to reach each given geographic location—e.g., because utilities are typically laid along roads. But as the number of geographic locations increases, these algorithms become exponentially more computationally expensive to run. For this reason, most (if not all) commercially-available drive-routing programs place a threshold limit on the number of geographic locations that can be provided as inputs.

In order to solve these problems, the present disclosure is directed to systems, methods, and computer-readable media that improve conventional cost- and distance-estimation methods by automatically clustering geographic locations and using drive-routing software to determine distances therebetween. Breaking down large sets of geographic locations into smaller clusters (which can be processed on a per-cluster basis) substantially reduces the computational resources required to carry out the desired drive-routing tasks.

Embodiments of the present disclosure utilize a novel combination of clustering methods that is well suited for a variety of applications, including providing accurate estimates of shortest road distances between geographic locations. More specifically, in some embodiments, affinity propagation (AP) is initially utilized to form clusters of the geographic locations. In some cases, AP breaks down the geographic location into sufficiently-small clusters. But in many cases—e.g., depending on the number of locations and the shape of their distribution—AP, by itself, is insufficient.

Another candidate type of clustering algorithm is density-based clustering algorithms. At a high level, these algorithms attempt to form sufficiently-dense clusters of data points (e.g., given a maximum radius between points of a same cluster and/or other parameters). But unfortunately, these algorithms tend to exclude "outlier" data points from all clusters, which is unsuitable for applications like cost estimation where all data points (e.g., geographic locations) must be included in order to produce reliable results.

In order to avoid these pitfalls, embodiments of the present disclosure utilize a combination of density-based clustering and k-means clustering. By definition, k-means clustering algorithms require the number of clusters to be formed (i.e., k) to be provided as an input. In order to determine a suitable k value, embodiments of the present disclosure form density-based clusters. The number of density-based clusters formed is used as k in a k-means clustering algorithm, and the geographic locations are clustered accordingly.

The present disclosure further comprises methods of estimating a length of utility (e.g., fiber) needed to connect the geographic locations to existing services (e.g., an existing network). Such methods further enhance the accuracy of the resulting distance and cost estimates.

Accordingly, a first aspect of the present disclosure is directed to a method for clustering geographic locations. One or more first clusters are formed using affinity propagation. It is determined that a first cluster of the one or more first clusters comprises more than a threshold number of the geographic locations (e.g., more than a maximum number of inputs accepted by a drive-routing software application). Based on the first cluster comprising more than the threshold number of the geographic locations, a quantity of second clusters of the geographic locations is determined using a density-based clustering algorithm. The quantity of third clusters are formed from the geographic locations using k-means clustering.

A second aspect of the present disclosure is directed to a second method for providing a cost estimate. A quantity of first clusters of geographic locations are determined using a density-based clustering algorithm. The quantity of second clusters are formed using a k-means clustering algorithm. A determination of a plurality of driving routes is caused, each of the plurality of driving routes connecting each geographic location of a corresponding cluster of the second clusters. A cost estimate is provided based on a sum of lengths of each of the plurality of driving routes.

A third aspect of the present disclosure is directed to a third method for estimating a cost. A cluster of geographic locations is formed using at least one selected from the following: a density-based clustering algorithm and a k-means clustering algorithm. A first route connecting each of the geographic locations is determined. A second route extending between the cluster a geographic point served by a service provider is determined. Based on a length of the first route and a length of the second route, a cost to route a utility from the service provider to the geographic locations is estimated.

Referring to FIG. 1, an exemplary computer environment is shown and designated generally as computing device 100 that is suitable for use in implementations of the present disclosure. Computing device 100 is but one example of a suitable computing environment and is not intended to suggest any limitation as to the scope of use or functionality of the invention. Neither should computing device 100 be interpreted as having any dependency or requirement relating to any one or combination of components illustrated. In aspects, the computing device 100 is generally defined by its capability to transmit one or more signals to a an access point and receive one or more signals from the access point (or some other access point); the computing device 100 may be referred to herein as a user equipment, wireless communication device, or user device, The computing device 100 may take many forms; non-limiting examples of the computing device 100 include a cell phone, tablet, internet of things (IoT) device, smart appliance, automotive or aircraft component, pager, personal electronic device, wearable electronic device, activity tracker, desktop computer, laptop, PC, and the like.

The implementations of the present disclosure may be described in the general context of computer code or machine-useable instructions, including computer-executable instructions such as program components, being executed by a computer or other machine, such as a personal data assistant or other handheld device. Generally, program components, including routines, programs, objects, components, data structures, and the like, refer to code that performs particular tasks or implements particular abstract data types. Implementations of the present disclosure may be practiced in a variety of system configurations, including handheld devices, consumer electronics, general-purpose computers, specialty computing devices, etc. Implementations of the present disclosure may also be practiced in distributed computing environments where tasks are performed by remote-processing devices that are linked through a communications network.

With continued reference to FIG. 1, computing device 100 includes bus 102 that directly or indirectly couples the following devices: memory 104, one or more processors 106, one or more presentation components 108, input/output (I/O) ports 110, I/O components 112, and power supply 114.

Bus 102 represents what may be one or more busses (such as an address bus, data bus, or combination thereof). Although the devices of FIG. 1 are shown with lines for the sake of clarity, in reality, delineating various components is not so clear, and metaphorically, the lines would more accurately be grey and fuzzy. For example, one may consider a presentation component such as a display device to be one of I/O components 112. Also, processors, such as one or more processors 106, have memory. The present disclosure hereof recognizes that such is the nature of the art, and reiterates that FIG. 1 is merely illustrative of an exemplary computing environment that can be used in connection with one or more implementations of the present disclosure. Distinction is not made between such categories as "workstation," "server," "laptop," "handheld device," etc., as all are contemplated within the scope of FIG. 1 and refer to "computer" or "computing device."

Computing device 100 typically includes a variety of computer-readable media. Computer-readable media can be any available media that can be accessed by computing device 100 and includes both volatile and nonvolatile media, removable and non-removable media. By way of example, and not limitation, computer-readable media may comprise computer storage media and communication media. Computer storage media includes both volatile and nonvolatile, removable and non-removable media implemented in any method or technology for storage of information such as computer-readable instructions, data structures, program modules or other data.

Computer storage media includes RAM, ROM, EEPROM, flash memory or other memory technology, CD-ROM, digital versatile disks (DVD) or other optical disk storage, magnetic cassettes, magnetic tape, magnetic disk storage or other magnetic storage devices. Computer storage media does not comprise a propagated data signal.

Communication media typically embodies computer-readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer-readable media.

Memory 104 includes computer-storage media in the form of volatile and/or nonvolatile memory. Memory 104 may be removable, nonremovable, or a combination thereof. Exemplary memory includes solid-state memory, hard drives, optical-disc drives, etc. Computing device 100 includes one or more processors 106 that read data from various entities such as bus 102, memory 104 or I/O components 112. One or more presentation components 108 presents data indications to a person or other device. Exemplary one or more presentation components 108 include a display device, speaker, printing component, vibrating component, etc. I/O ports 110 allow computing device 100 to be logically coupled to other devices including I/O components 112, some of which may be built in computing device 100. Illustrative I/O components 112 include a microphone, joystick, game pad, satellite dish, scanner, printer, wireless device, etc.

A first radio 120 and second radio 130 represent radios that facilitate communication with one or more wireless networks using one or more wireless links. In aspects, the first radio 120 utilizes a first transmitter 122 to communicate with a wireless network on a first wireless link and the second radio 130 utilizes the second transmitter 132 to communicate with a wireless network on a second wireless link. Though two radios are shown, it is expressly conceived that a computing device with a single radio (i.e., the first radio 120 or the second radio 130) could facilitate communication over one or more wireless links with one or more wireless networks via both the first transmitter 122 and the second transmitter 132. Illustrative wireless telecommunications technologies include CDMA, GPRS, TDMA, GSM, and the like. One or both of the first radio 120 and the second radio 130 may carry wireless communication functions or operations using any number of desirable wireless communication protocols, including 802.11 (Wi-Fi), WiMAX, LTE, 3G, 4G, LTE, 5G, NR, VoLTE, or other VoIP communications. In aspects, the first radio 120 and the second radio 130 may be configured to communicate using the same protocol but in other aspects they may be configure dot communicate using different protocols. In some embodiments, including those that both radios or both wireless links are configured for communicating using the same protocol, the first radio 120 and the second radio 130 may be configured to communicate on distinct frequencies or frequency bands (e.g., as part of a carrier aggregation scheme). As can be appreciated, in various embodiments, each of the first radio 120 and the second radio 130 can be configured to support multiple technologies and/or multiple frequencies.

Figure 2:
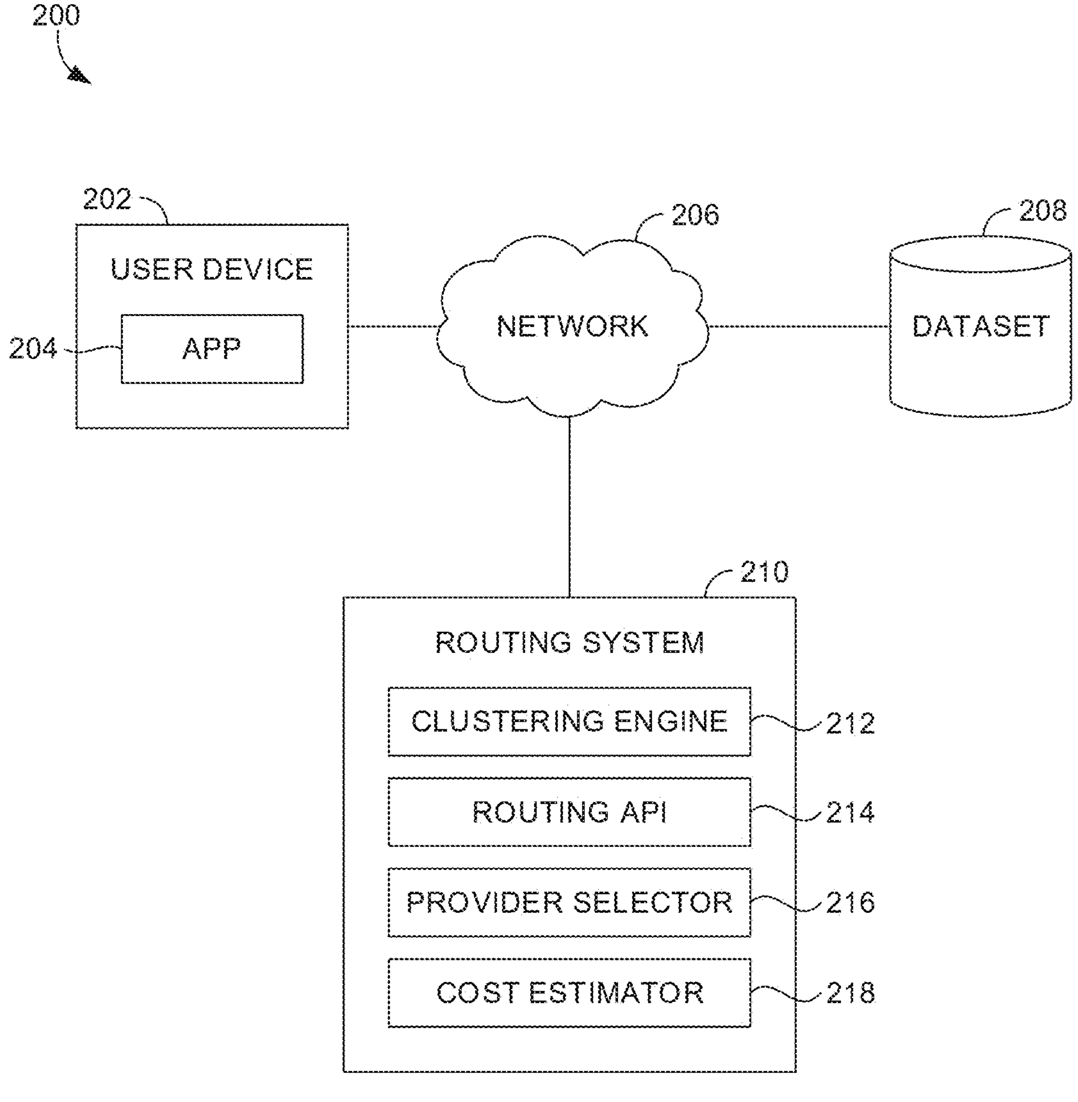
FIG. 2 is a block diagram illustrating an exemplary system in which implementations of the present disclosure may be employed.

FIG. 2 is a block diagram illustrating an exemplary system 200 for clustering geographic locations and determining routes between the geographic locations in accordance with implementations of the present disclosure. It should be understood that this and other arrangements described herein are set forth only as examples. Other arrangements and elements (e.g., machines, interfaces, functions, orders, and groupings of functions, etc.) can be used in addition to or instead of those shown, and some elements can be omitted altogether. Further, many of the elements described herein are functional entities that can be implemented as discrete or distributed components or in conjunction with other components, and in any suitable combination and location. Various functions described herein as being performed by one or more entities can be carried out by hardware, firmware, and/or software. For instance, various functions can be carried out by a processor executing instructions stored in memory.

The system 200 is an example of a suitable architecture for implementing certain aspects of the present disclosure. Among other components not shown, the system 200 includes a user device 202, a routing system 210, and a dataset 208. Each of the user device 202, the routing system 210, and the dataset 208 shown in FIG. 2 can comprise one or more computer devices, such as the computing device 100 of FIG. 1, discussed above. As shown in FIG. 2, the user device 202, the routing system 210, and the dataset 208 can communicate via a network 206, which can include, without limitation, one or more local area networks (LANs) and/or wide area networks (WANs). Such networking environments are commonplace in offices, enterprise-wide computer networks, intranets, and the Internet. It should be understood that any number of client devices and server devices can be employed within the system 200 within the scope of the present technology. Each can comprise a single device or multiple devices cooperating in a distributed environment. For instance, the routing system 210 can be provided by multiple server devices collectively providing the functionality of the routing system 210 as described herein. Additionally, other components not shown can also be included within the network environment.

The user device 202 can be a client device on the client side of operating environment 200, while the routing system 210 can be on the server side of operating environment 200. The routing system 210 can comprise server-side software designed to work in conjunction with client-side software on the user device 202 so as to implement any combination of the features and functionalities discussed in the present disclosure. For instance, the user device 202 can include an application 204 for interacting with the routing system 210. The application 204 can be, for instance, a web browser or a dedicated application for providing functions, such as those described herein. This division of operating environment 200 is provided to illustrate one example of a suitable environment, and there is no requirement for each implementation that any combination of the user device 202 and the routing system 210 remain as separate entities. While the operating environment 200 illustrates a configuration in a networked environment with a separate user device 202 and routing system 210, it should be understood that other configurations can be employed in which components are combined. For instance, in some configurations, the user device 202 can also provide capabilities of the technology described in association with the routing system 210.

The user device 202 can comprise any type of computing device capable of use by a user. For example, in one aspect, the user device can be the type of computing device 100 described in relation to FIG. 1 herein. By way of example and not limitation, the user device 202 can be embodied as a personal computer (PC), a laptop computer, a mobile or mobile device, a smartphone, a tablet computer, a smart watch, a wearable computer, a personal digital assistant (PDA), an MP3 player, global positioning system (GPS) or device, video player, handheld communications device, entertainment system, vehicle computer system, embedded system controller, remote control, appliance, consumer electronic device, a workstation, or any combination of these delineated devices, or any other suitable device. A user can be associated with the user device 202 and can interact with the routing system 210 via the user device 202.

At a high level, the routing system 210 determines routes between geographic locations and estimates distances and/or costs based on the routes. Geographic locations are received—e.g., from the dataset 208—and clustered. Routing distances connecting each geographic point in a cluster are determined. A last-mile distance can also be determined. Based on the routing distances and/or last-mile distance, a cost—e.g., to route a utility to the geographic points—is estimated.

As shown in FIG. 2, the routing system 210 includes a clustering engine 212, a routing application programming interface (API) 214, a provider selector 216, and a cost estimator 218. The components of the routing system 210 can be in addition to other components that provide further additional functions beyond the features described herein. The routing system 210 can be implemented using one or more server devices, one or more platforms with corresponding application programming interfaces, cloud infrastructure, and the like. While the routing system 210 is shown separate from the user device 202 in the configuration of FIG. 2, it should be understood that in other configurations, some or all of the functions of the routing system 210 can be provided on the user device 202.

In one aspect, the functions performed by components of the routing system 210 are associated with one or more applications, services, or routines. In particular, such applications, services, or routines can operate on one or more user devices or servers, be distributed across one or more user devices and servers, or be implemented in the cloud. Moreover, in some aspects, these components of the routing system 210 can be distributed across a network, including one or more servers and client devices, in the cloud, and/or can reside on a user device. Moreover, these components, functions performed by these components, or services carried out by these components can be implemented at appropriate abstraction layer(s) such as the operating system layer, application layer, hardware layer, etc., of the computing system(s). Alternatively, or in addition, the functionality of these components and/or the aspects of the technology described herein can be performed, at least in part, by one or more hardware logic components. For example, and without limitation, illustrative types of hardware logic components that can be used include field-programmable gate arrays (FPGAs), application-specific integrated circuits (ASICs), application-specific standard products (ASSPs), system-on-a-chip systems (SOCs), complex programmable logic devices (CPLDs), etc. Additionally, although functionality is described herein with regards to specific components shown in example system 200, it is contemplated that in some aspects, functionality of these components can be shared or distributed across other components.

At a high level, the routing system 210 can be configured to perform any of several types of operations, including clustering geographic locations, determining routes between geographic locations, selecting a provider, and estimating costs. Many of these aspects are applicable to a variety of technological fields. Thus, while much of the following discussion focuses on estimating a cost of routing fiber to predetermined geographic locations, this is merely a non-limiting example. Additional applications of the aspects described herein, such as routing other types of utilities (e.g., cable(s) or plumbing) and optimizing package-delivery routes, are discussed below.

By way of background, estimating a cost to route fiber to geographic locations typically involves estimating a length or distance over which the fiber must be routed. For example, a cost to route fiber to a new area depends principally on the length of fiber needed. This length depends on two factors: (a) the length required to route the fiber to each desired geographic location and (b) the length required to connect the fiber to existing services (e.g., the length of fiber required to "tie in" the geographic points to an existing fiber network). The former is now discussed in relation to FIGS. 3-5B; the latter is discussed below with respect to FIGS. 6-7.

One method of estimating the length of the fiber necessary to reach each geographic location involves the use of routing software. Routing software is generally configured to determine an optimal route connecting two or more geographic locations provided as inputs. Typically, the route is determined along a road network (e.g., is a driving route), though some routing software can alternatively or additionally determine walking routes, public-transit routes, and/or cycling routes, to name a few examples. Commonly-used routing software includes Google Maps® and Precisely®.

When the geographic locations are provided as inputs into routing software (e.g., a routing API), the resulting route (e.g., driving route) is usually a reasonable approximation of the length of the fiber needed to reach each of the geographic points. But as the number of geographic locations increases, the computational cost of determining an optimal route between the locations increases exponentially. For this reason, most (if not all) routing software is configured only to accept up to a predetermined number of locations as inputs. Thus, in many applications, it is computationally infeasible (or impossible) to determine a route connecting each of the geographic locations simply by providing the locations as inputs to routing software.

Figure 3:
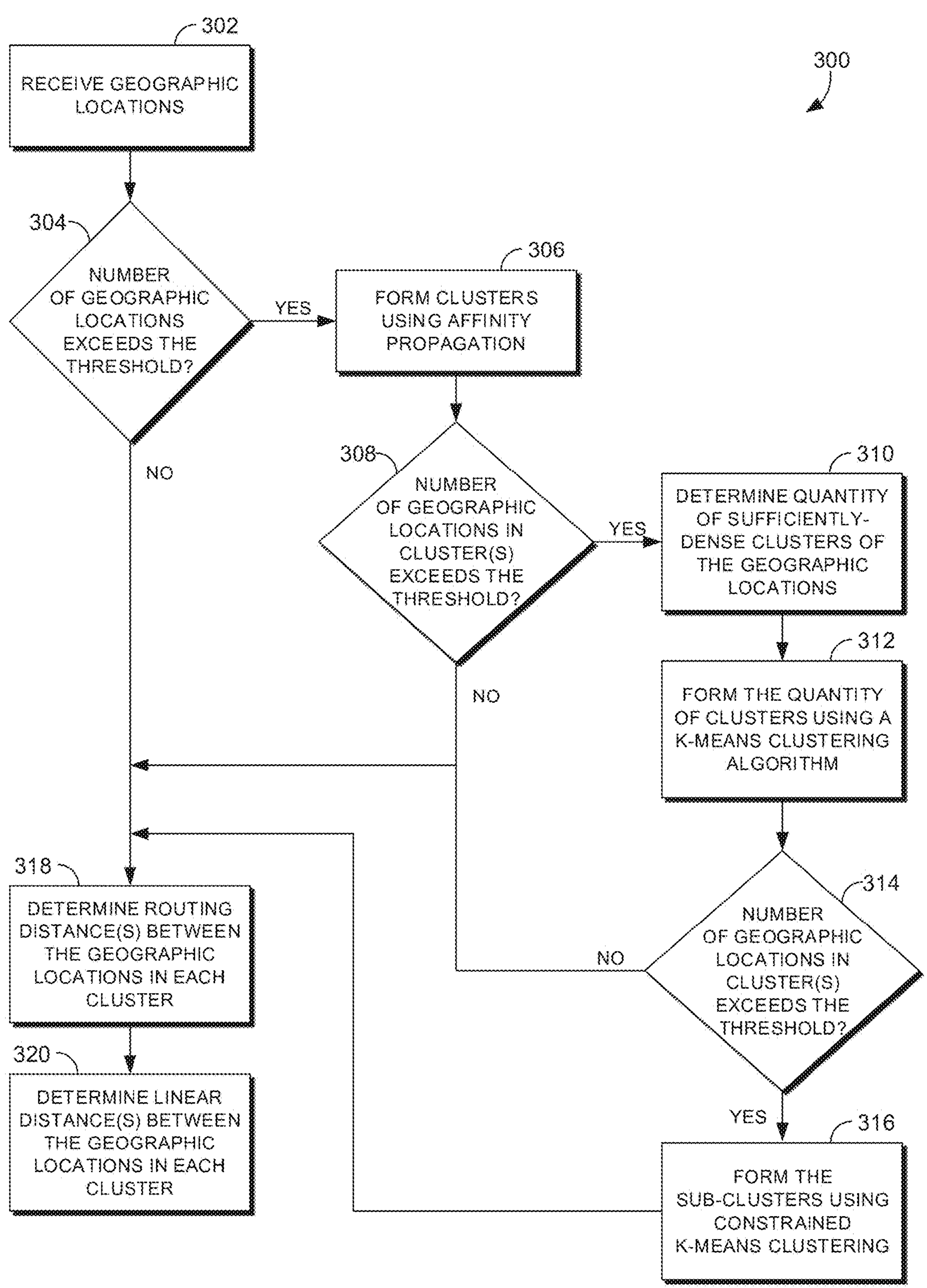
FIG. 3 is a flow diagram of an exemplary method for determining routing distances between geographic points in accordance with aspects herein.

The method 300 of FIG. 3 overcomes these problems by, at a high level, grouping geographic locations into clusters small enough to be taken as inputs by a routing API. The method 300 also comprises determining routing distances between the geographic locations using the routing API (which can serve as an upper-bound estimate of the distance needed to connect the locations) and determining linear distances between the geographic locations (a lower-bound estimate).

Figure 4:
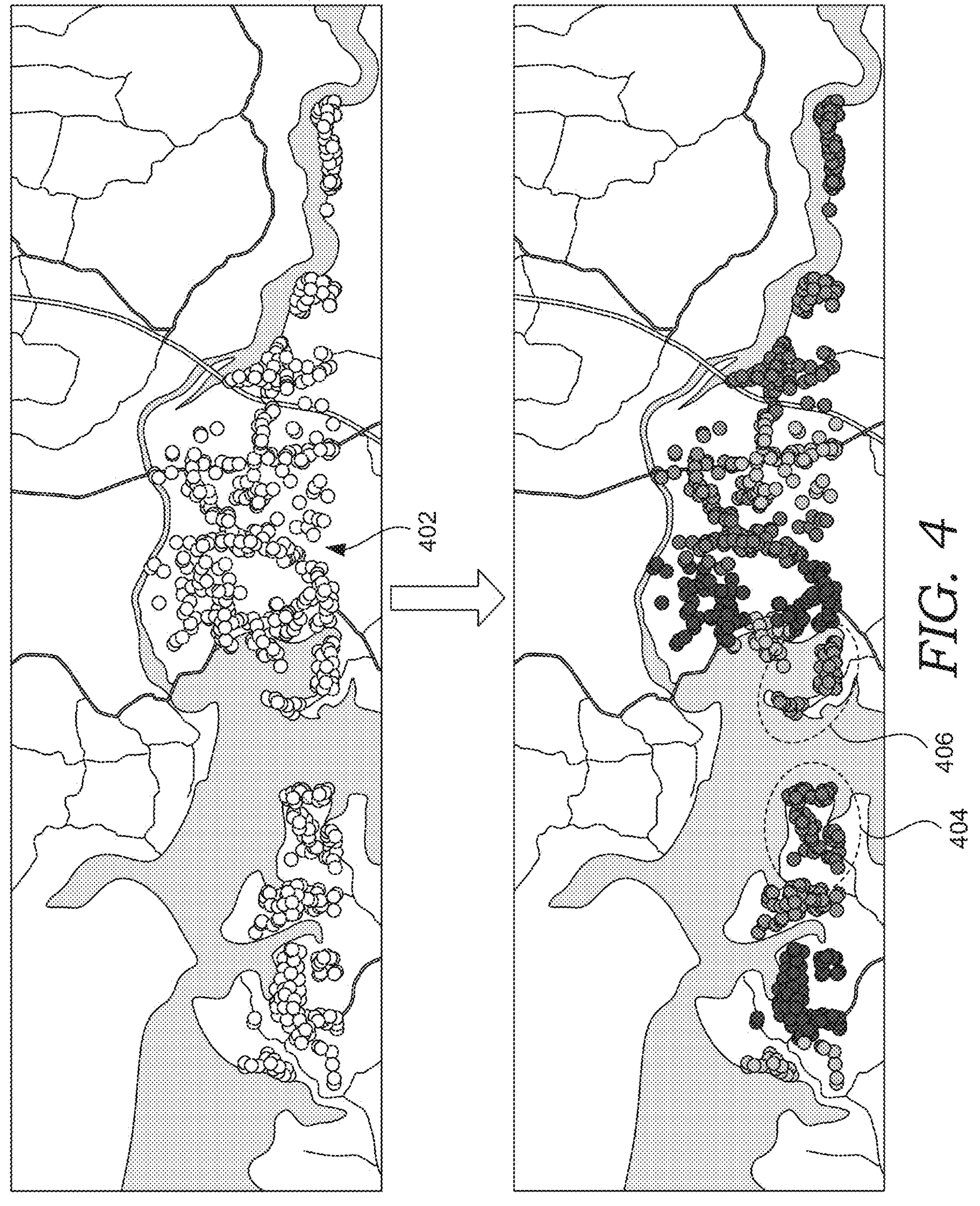
FIG. 4 depicts a process of clustering geographic locations in accordance with aspects herein.

Initially, at block 302, geographic locations are received. An example set of geographic locations 402 is shown in FIG. 4. The geographic locations can be received by the clustering engine 212 shown in FIG. 2—e.g., from the dataset 208 over the network 206. The geographic locations can be latitude-longitude coordinates, addresses, or any other suitable representation(s). In some aspects, the geographic locations are locations to which fiber is to be routed. For example, one may wish to estimate a cost of routing fiber to a region (e.g., a census block). The region may comprise a plurality of discrete residential and/or commercial buildings. In these aspects, addresses (for example) corresponding to the residential and/or commercial buildings can be imported by the clustering engine 212.

At block 304, the clustering engine 212 determines whether the number of received geographic locations exceeds a threshold. The threshold can be based on (e.g., equal to) a maximum number of geographic locations a routing API is configured to receive. As shown in FIG. 3, if the number of received geographic locations does not exceed the threshold, there is no need to cluster the geographic locations, so the method proceeds to block 318. But if the number of received geographic locations exceeds the threshold, the clustering engine 212 must break the geographic locations into smaller clusters, starting at block 306.

At block 306, the clustering engine 212 forms clusters using affinity propagation. At a high level, affinity propagation is a clustering technique that clusters points based on the points' similarities to one another. An affinity propagation algorithm comprises a function s(i, j) that quantifies a similarity between input data points i and j. The similarity function s can be defined in any number of ways. In the context of the present disclosure, the similarity function s can be configured to evaluate the similarity of input points i and j, which can be geographic locations, based on their Euclidean distances from one another. Specifically, the smaller then Euclidean distance between a pair of geographic locations, the more "similar" the geographic locations can be according to the similarity function. Accordingly, when the geographic locations are clustered using the affinity propagation algorithm, geographic locations that are closer together are more likely to be included in the same cluster.

Affinity propagation is particularly well suited for aspects of the present disclosure. Unlike many other clustering algorithms, affinity propagation does not require the user to specify parameters that constrain the number, shape, or size of the clusters to be formed. This is important because the geographic locations can distributed in any shape or density—e.g., can be sparse, rural locations, irregularly-distributed locations separated by bodies of water, or densely-packed, urban locations. Thus, optimal clusters of geographic locations can vary greatly in number, shape, and size, for example. Accordingly, affinity propagation is more likely than many other clustering algorithms to produce clusters of geographic locations that accurately represent the underlying data and result in accurate routing distance estimates.

As shown at block 308, if each cluster formed via affinity propagation contains less than or equal to the threshold number of geographic locations, there is no need to form additional clusters, so the method proceeds to block 318. However, because affinity propagation can produce any number of clusters, one or more of the resulting clusters may still contain too many geographic points (e.g., more than the threshold number of inputs the routing API can accept). For instance, if the geographic locations are densely-packed urban residences, affinity propagation may produce only one cluster. In the event at least one cluster contains more than the threshold number of geographic locations, the method 300 proceeds to block 310.

When affinity propagation fails, another type of clustering algorithm is required. One candidate is density-based clustering. Density-based clustering algorithms form clusters of points that comprise relatively high-density areas. One popular density-based clustering algorithm suitable for aspects herein is density-based spatial clustering of applications with noise (DBSCAN). Like affinity propagation, density-based clustering algorithms, including DBSCAN, typically do not require a user to specify a number of clusters to be formed.

However, density-based clustering algorithms do not necessarily cluster every data point. For example, when a data point is not a member of any sufficiently-dense group of data points, some density-based clustering algorithms will label that point an "outlier" and exclude the data point from all clusters. This renders density-based clustering algorithms, in isolation, unsuitable for at least some aspects of the present disclosure. That is, since one object of the present disclosure is to estimate a distance and/or cost of routing fiber to each geographic location received at block 304, each received geographic location must be included in a cluster.

Thus, in some aspects, the method 300 comprises utilizing density-based clustering to identify a quantity of sufficiently-dense clusters. In these embodiments, a different clustering algorithm (e.g., k-means clustering) can be used to form the quantity of clusters. This approach obtains the benefits of density-based clustering (e.g., avoiding the need to specify a number of clusters to be formed) while ensuring that every geographic location is included in a cluster.

Accordingly, at step 310, the clustering engine 212 determines a quantity of sufficiently-dense clusters of the geographic locations. In some embodiments, the clustering engine 212 utilizes a density-based clustering algorithm to form clusters of the geographic locations. The density-based clustering algorithm can comprise, without limitation, DBSCAN or ordering points to identify the clustering structure (OPTICS). The clustering engine 212 may provide the geographic locations as inputs to the density-based clustering algorithm and identify the quantity of clusters formed by the density-based clustering algorithm.

At step 312, the quantity of clusters of the geographic locations are formed. The quantity of clusters can be formed using a k-means clustering algorithm. At a high-level, k-means clustering comprises forming a predetermined number of clusters (i.e., k clusters) of data points. Such algorithms are well known in the art. The quantity of clusters determined at step 310 can be utilized as k in the k-means clustering algorithm, forcing the k-means algorithm to form the quantity of clusters of the geographic points.

As an alternative to k-means clustering (i.e., step 312), in some embodiments, the clustering engine 212 forms clusters using a density-based approach (e.g., as explained with respect to step 310) and adds each non-clustered data point (if any) to a nearest cluster. For example, each geographical location not included in a cluster by the density-based clustering algorithm can be assigned to (a) a same cluster as a nearest geographic location or (b) a cluster to which the nearest core point belongs (e.g., in embodiments where the clustering algorithm is DBSCAN).

In some cases, one or more of the cluster(s) formed at step 312 (or step 310 when k-means clustering is not utilized) may still exceed the threshold number of geographic locations. In such cases, it is possible to repeat steps 310 and/or 312 in order to further break down the oversized cluster(s) into smaller clusters. However, this process could continue indefinitely, resulting in significant computational costs.

In order to avoid this situation, the oversized clusters can be broken down using a constrained k-means clustering algorithm. In some embodiments, the clustering engine 212 determines that a cluster (e.g., formed at step 310 or 312) comprises more than the threshold number of geographic locations (step 314). Based on this determination, the clustering engine 212 determines, at step 316, a number of sub-clusters to be formed within the cluster. The number of sub-clusters to be formed can be determined such that each sub-cluster comprises a total number of the geographic locations that is below the threshold number. To illustrate, if the cluster contains 900 geographic locations and the threshold is 300 geographic locations, the clustering engine 212 may determine that 3 (or at least 3) sub-clusters must be formed.

Following determination of the number of sub-clusters to be formed, the clustering engine 212, at step 316, may form the determined number of sub-clusters using a k-means clustering algorithm. In order to, for example, ensure that none of the k clusters exceeds the threshold number of geographic locations, the k-means clustering algorithm can be constrained such that each sub-cluster contains an equal (or as-equal-as-possible) number of geographic locations.

To illustrate, consider a cluster containing 899 geographic locations where 3 sub-clusters are to be formed and the threshold is 300 geographic locations. In this case, the k-means clustering algorithm may be constrained such that it is required to create 3 sub-clusters of 300, 300, and 299 geographic locations, respectively.

The end result of the steps performed by the clustering engine 212 is a plurality of clusters—e.g., clusters 404 and 406 of FIG. 4—of geographic locations. As discussed, in embodiments, each cluster comprises no more than the threshold number of geographic locations—e.g., the maximum number of inputs that can be accepted by routing software. Thus, at this stage, the clustered geographic locations are ready to be provided to the routing software.

Figure 5B:
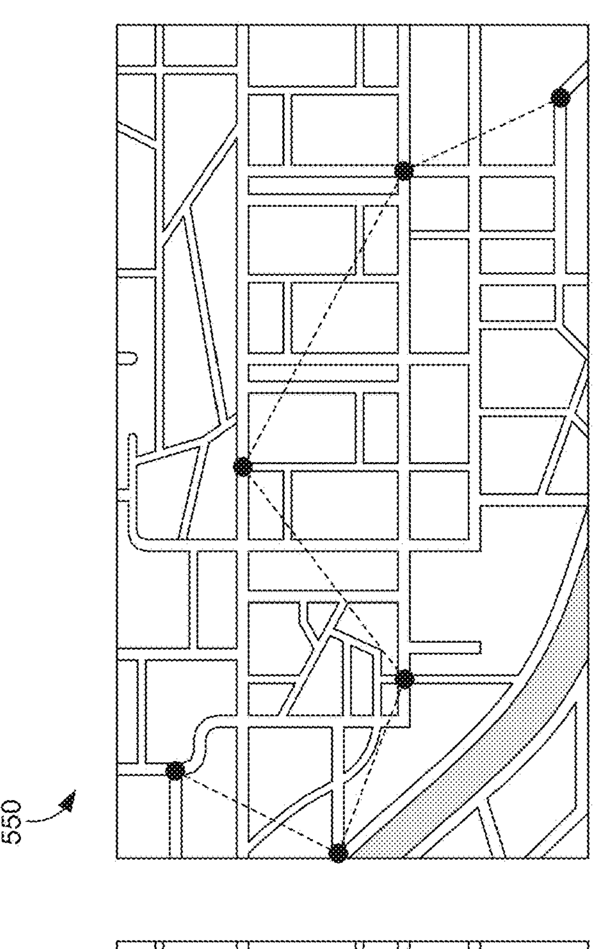
FIGS. 5A-5B depict methods of estimating distances between geographic points in accordance with aspects herein.
Figure 5A:
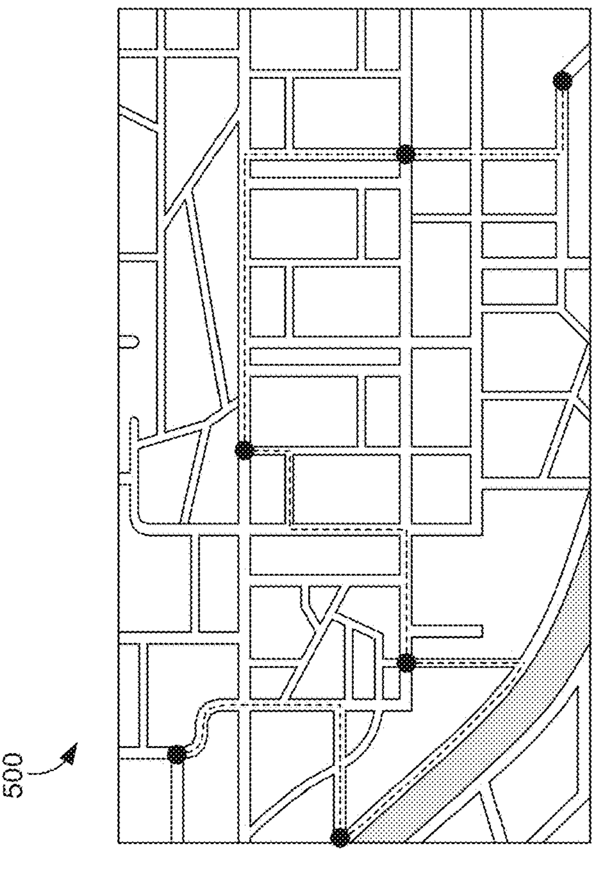

Accordingly, at step 318, each cluster of geographic locations is provided as a set of inputs to routing software (e.g., a routing API 214). The routing software is generally configured to determine a shortest path (e.g., road path) that connects each input location. The distance traversed by the road path is, for example, a reasonable upper-bound approximation of the length of fiber required in order to reach each geographic point. To illustrate, FIG. 5A shows an example route 500 connecting a plurality of clustered geographic locations. The dashed line represents the route 500 determined by the routing API 214.

Step 318 can be repeated for each cluster of geographic points. The road distances for the respective clusters can be summed in order to, for example, produce an upper-bound estimate of the length of fiber needed to connect each of the geographic points (i.e., for all clusters). However, this sum does not reflect the length of fiber needed to connect the clusters to one another. Thus, in some embodiments, one or more components of the routing system 210 also (a) determine road distances needed to connect the plurality of clusters to one another and (b) add each of these distances to the sum of the road distances.

The sum determined at step 318 tends to overestimate the length of fiber necessary to reach each of the geographic locations. For example, in many cases, it is most cost-efficient for the fiber to comprise a central trunk line and a plurality of branches from the trunk line extending to individual geographic locations. Routing APIs return sequential, location-by-location routes that cannot follow a trunk-line format. As another example, when routing fiber (or any other utility), it is sometimes possible to "cut corners"—i.e., save distance by routing the fiber across an area (e.g., a park or a body of water) that is not traversed by a road. Thus, it is useful to additionally determine a lower-bound estimate for the length of fiber needed to reach each of the geographic points.

Accordingly, at step 320, a lower-bound estimate is determined by determining linear paths (and corresponding distances) between the geographic locations of each cluster. (Although referred to as "linear" distances, in some embodiments, these distances are haversine distances, which account for the earth's curvature.) Instead of following roads, the linear distances extend directly from one geographic location to the next—e.g., in the same sequence in which the points were traversed by the route 500 determined by the routing API 214. FIG. 5B illustrates such an example route 550. As with step 318, step 320 can be repeated for each cluster formed by the clustering engine 212. This total distance can be added to the distances required to connect the clusters to one another (as previously discussed) in order to produce a final lower-bound distance estimate. This approach tends to underestimate the length of fiber needed to connect each geographic point (as desired) since the linear route 550 will almost certainly extend through areas where fiber cannot be laid, such as private properties, buildings, and so on.

The upper- and lower-bound estimates produced at steps 318 and 320, respectively, reflect an amount of fiber needed to reach each of the plurality of geographic points imported at step 302. However, these estimates do not reflect an additional variable: the length of fiber needed to connect those points to a service provider (e.g., to tie the geographic points into an existing network).

Figure 6:
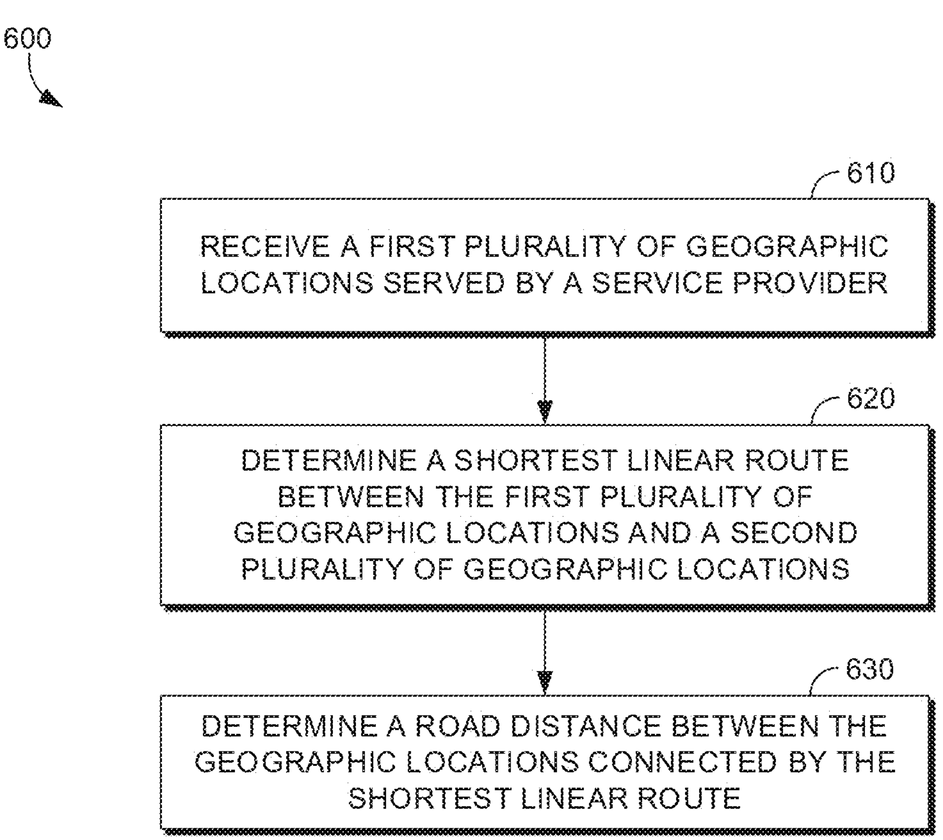
FIG. 6 is a flow diagram of an exemplary method for determining road distances between geographic points in accordance with aspects herein.
Figure 7:
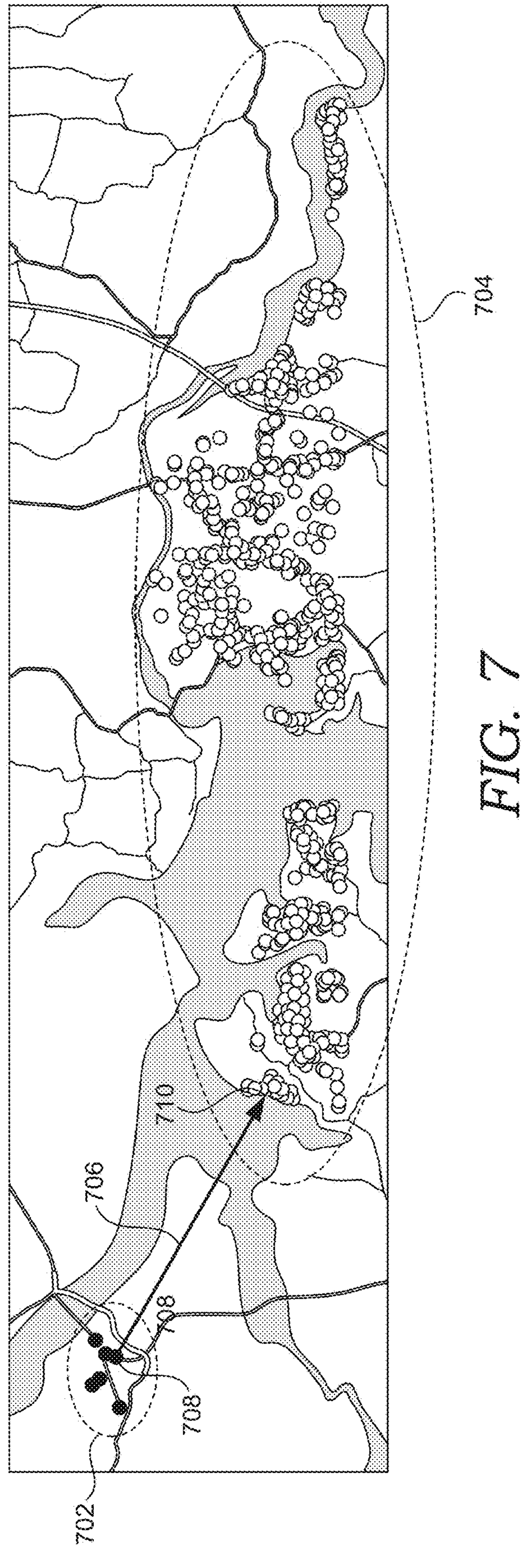
FIG. 7 depicts a method of determining a last-mile distance in accordance with aspects herein.

Accordingly, FIG. 6 provides a method 600 for selecting a provider and determining a shortest distance between the provider and the geographic locations received at step 302. Any of the steps described with respect to FIG. 6 can be performed by the provider selector 216 of FIG. 2. Additionally, some aspects of the method 600 are illustrated in FIG. 7, as explained in more detail below.

At a first step 610, a first plurality of geographic locations 702 served by a service provider is received. The first plurality of geographic locations 702 can comprise any of the characteristics previously described in regard to the geographic locations received at step 302 of FIG. 3. In some examples, the first plurality of geographic locations 702 comprises addresses (e.g., homes or businesses) served by a fiber (or other utility) provider.

At step 620, a shortest linear route 706 between the first plurality of geographic locations 702 and a second plurality of geographic locations 704 is determined. The second plurality of geographic locations 704 can comprise locations to which fiber is to be routed. The second plurality of geographic locations 704 can comprise any of the characteristics previously described in regard to the geographic locations received at step 302 of FIG. 3.

In some cases, a goal of step 620 is to determine nearest neighbors 708 and 710 of the first 702 and second 704 pluralities of geographic locations, respectively. In some applications, this means finding or estimating the minimum length of fiber needed to connect a first location 708 of the first plurality of geographic locations 702 to a second location 710 of the second plurality of geographic locations 704. That is, the provider selector 216 may determine distances between pairs of locations of the first and second pluralities of locations and select the first geographic location 708 and second geographic location 710 based on a determination that the geographic locations 708 and 710 are closer together than any other pair of locations of the first and second pluralities.

In some embodiments, the provider selector 216 selects the first 708 and second 710 geographic locations based on the first 708 and second 710 geographic locations being separated by a minimum road distance. However, in some cases—e.g., depending on the number of geographic locations in the first and second pluralities—it may not be computationally feasible to compare road distances between the first 702 and second 704 pluralities of geographic locations. Thus, in other embodiments, the provider selector 216 selects the first 708 and second 710 geographic locations based on linear or haversine distances between the geographic locations, which is far less computationally expensive.

In order to further increase computational efficiency, the provider selector 216 can select the first 708 and second 710 geographic locations using a ball tree algorithm. At a high level, ball tree is a type of algorithm that organizes data points into a tree structure. Among other applications, ball tree algorithms can be used to efficiently solve nearest-neighbor problems. It has been experimentally observed that ball tree algorithms significantly speed up the process of selecting the first 708 and second 710 geographic locations.

The linear route 706 connecting the first 708 and second 710 geographic locations likely underestimates the amount of fiber needed to connect the first 708 and second 710 geographic locations since the linear route 706 almost certainly passes through locations at which fiber cannot be laid (e.g., private property, buildings, and/or bodies of water). Thus, at step 630, a road distance between the first 708 and second 710 geographic locations is determined. The road distance can be determined using the routing API 214 or any other routing software, for example. Since fiber (and other utilities) can typically be laid along roads, the road distance is likely a more accurate estimate of the length of fiber required to connect the first 708 and second 710 geographic locations.

In some embodiments, the method 600 is repeated for a plurality of providers. The resulting road distances can be compared, and the provider selector 216 can select the provider corresponding to the shortest road distance. Put another way, the provider selector 216 can determine that routing fiber from a particular provider would require the shortest length of fiber.

Figure 8:
FIG. 8 depicts a flow diagrams of an exemplary method of estimating routing costs in accordance with aspects herein.
Figure 8:
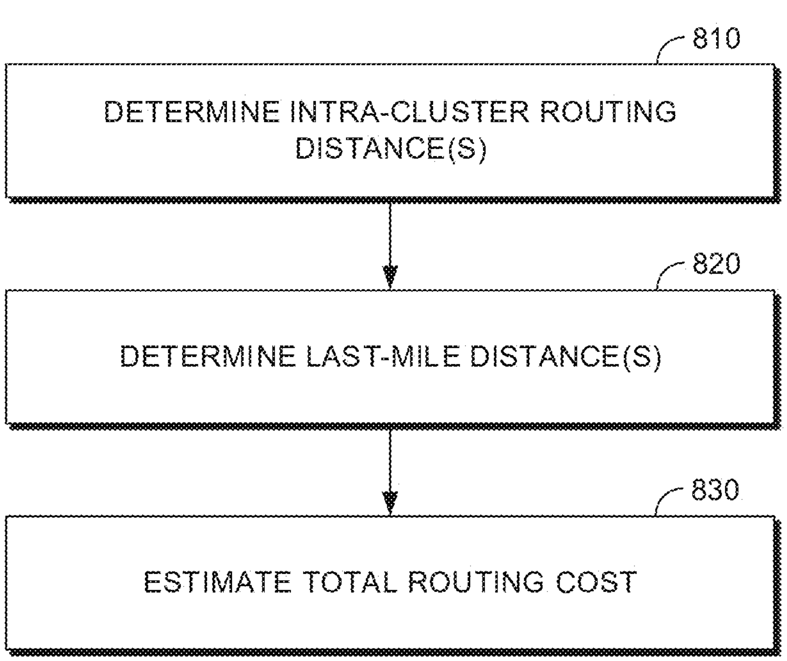

Turning now to FIG. 8, a method 800 of estimating a routing cost is provided. More particularly, the method 800 can be used to estimate a total cost of routing fiber (or another utility) to geographic locations.

At step 810, intra-cluster routing distances are determined. The data points in the cluster(s) can represent geographic locations in accordance with aspects described herein. The intra-cluster distances can be estimated lengths of fiber needed to connect a first geographic location of a cluster to a second geographic location of the cluster, the second geographic location of the cluster to a third geographic location of the cluster, and so on until each geographic location of the cluster has been connected. Some suitable methods of performing this step are described herein with reference to FIGS. 3-5B, for example.

This process can be repeated for each cluster of geographic locations to which fiber is to be routed. The sum of all such intra-cluster routing distances represents the total estimated length of fiber needed to connect each of the geographic locations to the fiber network excluding the last-mile length of fiber, which is determined at step 820.

At step 820, a last-mile distance is determined. The last-mile distance can be an estimated length of fiber needed to connect a clustered geographic location to an existing fiber provider. Some suitable methods of determining or estimating the last-mile distance are described herein with respect to FIGS. 6-7, for example.

At step 830, a total routing cost is estimated. The total routing cost can be a sum of (a) the summed intra-cluster routing distances determined at step 810 and (b) the estimated last-mile distance determined at step 820. This estimate (and/or any other cost or distance estimates described herein) can be provided at a user interface.

As previously mentioned, while many embodiments of the present disclosure are described herein with reference to routing fiber, this is merely a non-limiting example. Other example applications of the techniques described herein include routing other utilities, such as television cables, electrical cables or wiring, plumbing (e.g., water-delivery infrastructure or sewer lines), and the like.

It is further contemplated that the techniques described herein are applicable outside the context of routing utilities. For example, some aspects of the present disclosure can be useful for optimizing solutions to vehicle routing problems (VRPs)—e.g., for package delivery and the like. For example, the clustering techniques described with reference to FIG. 3 can be employed to cluster package-delivery locations—e.g., into clusters of locations to be served be one or more delivery vehicles.

Many different arrangements of the various components depicted, as well as components not shown, are possible without departing from the scope of the claims below. Embodiments of our technology have been described with the intent to be illustrative rather than restrictive. Alternative embodiments will become apparent to readers of this disclosure after and because of reading it. Alternative means of implementing the aforementioned can be completed without departing from the scope of the claims below. Certain features and subcombinations are of utility and may be employed without reference to other features and subcombinations and are contemplated within the scope of the claims.

The invention claimed is:

1. A computer-implemented method comprising:

receiving a user request for a cost estimate to connect and route a utility along a route extending from one or more existing utility network tie-in locations to a plurality of geographic locations, wherein the user request includes at least a type of utility, the one or more existing utility network tie-in locations, a data set of the plurality of the geographic locations, and a threshold maximum number of the geographic locations, and wherein the type of utility comprises fiber, cable, plumbing, and/or a package-delivery service;

forming one or more first clusters of the geographic locations using affinity propagation;

determining that a first cluster of the one or more first clusters comprises more than the threshold maximum number of the geographic locations;

based on the first cluster comprising more than the threshold maximum number of the geographic locations, from the geographic locations of the first cluster, determining a quantity of second clusters of the geographic locations using a density-based clustering algorithm;

forming a quantity of third clusters from the geographic locations of the first cluster using k-means clustering, wherein the quantity of second clusters is used as a k parameter in the k-means clustering;

providing the geographic locations of each of the third clusters as inputs to a routing software program;

receiving, from the routing software program, a route connecting the geographic locations of each of the third clusters, wherein each of the third clusters comprises no more than the threshold maximum number of the geographic locations;

determining the cost estimate for connecting the utility along the route from the one or more existing utility network tie-in locations to each of the geographic locations of each of the third clusters; and fulfilling the user request by outputting the cost estimate to a user device.

2. The computer-implemented method of claim 1, further comprising:

causing determination of a first route between each geographic location of one of the third clusters.

3. The computer-implemented method of claim 2, wherein the first route comprises the route.

4. The computer-implemented method of claim 3, further comprising:

providing an upper-bound to the cost estimate based on a first length of the route;

determining a second route comprising linear paths between the geographic locations of the one third cluster; and providing a lower-bound to the cost estimate based on a second length of the second route.

5. The computer-implemented method of claim 1, wherein the threshold maximum number of the geographic locations is based on a maximum number of inputs the routing software program is configured to receive.

6. The computer-implemented method of claim 1, wherein, when the type of utility comprises the package-delivery service, the method further comprises:

assigning at least one package-delivery vehicle to each of the third clusters of the geographic locations.

7. The computer-implemented method of claim 1, further comprising:

based on determining that one of the third clusters comprises more than the threshold maximum number of the geographic locations, determining a number of sub-clusters to be formed from the one third cluster, wherein the number of sub-clusters is determined such that each sub-cluster comprises a total number of the geographic locations that is equal to or below the threshold maximum number; and splitting the one third cluster into the number of sub-clusters using the k-means clustering;

updating the cost estimate based on the number of sub-clusters; and fulfilling the user request by outputting the cost estimate that was updated to the user device.

* * * * *